US012635613B2

(12) United States Patent　　　(10) Patent No.:　US 12,635,613 B2
Corsiglia et al.　　　　　　　　　　(45) Date of Patent:　May 26, 2026

(54) SINGLE-PIECE CRANKSHAFT

(71) Applicant: Milwaukee Electric Tool Corporation, Brookfield, WI (US)

(72) Inventors: Luke P. Corsiglia, Brookfield, WI (US); Beth E. Cholst, Wauwatosa, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 153 days.

(21) Appl. No.: 18/341,062

(22) Filed: Jun. 26, 2023

(65) Prior Publication Data

US 2023/0413737 A1　　Dec. 28, 2023

Related U.S. Application Data

(60) Provisional application No. 63/356,327, filed on Jun. 28, 2022.

(51) Int. Cl.
　　*A01G 3/053*　　　　(2006.01)
　　*A01G 3/04*　　　　(2006.01)
(52) U.S. Cl.
　　CPC ...... *A01G 3/053* (2013.01); *A01G 2003/0461* (2013.01)
(58) Field of Classification Search
　　CPC .......... A01G 3/04; A01G 3/047; A01G 3/053; A01G 3/0535; A01G 2003/0461
　　See application file for complete search history.

(56) References Cited

U.S. PATENT DOCUMENTS

| | | | | |
|---|---|---|---|---|
| 2,630,628 A | * | 3/1953 | Hall | A01G 3/053 30/220 |
| 2,787,111 A | * | 4/1957 | Templeton | A01D 34/135 56/297 |
| 3,802,075 A | * | 4/1974 | Taylor | A01G 3/053 30/216 |
| 3,909,943 A | * | 10/1975 | Buschman | A01G 3/053 30/216 |

(Continued)

FOREIGN PATENT DOCUMENTS

| | | | | | |
|---|---|---|---|---|---|
| CN | 106912301 A | * | 7/2017 | | A01G 3/053 |
| CN | 107896683 A | * | 4/2018 | | A01G 3/053 |

(Continued)

OTHER PUBLICATIONS

European Search Report Corresponding with Application No. EP23176615 on Nov. 20, 2023 (1 page).

*Primary Examiner* — Jason Daniel Prone
(74) *Attorney, Agent, or Firm* — Dority & Manning, P.A.

(57)　　　ABSTRACT

Crankshafts for handheld power tools are provided. A crankshaft includes an input section configured to be coupled to a motive device and an output section comprising first and second engagement members. The first and second engagement members are configured to drive a first and second cutting implement, wherein the first and second engaging members are spaced apart from each other in a direction along a rotational axis of the crankshaft and in a direction transverse to the rotational axis of the crankshaft, and wherein the first and second cutting implements are each coupled to or detached from the crankshaft by translating relative to the crankshaft in a direction along the rotational axis.

20 Claims, 7 Drawing Sheets

(56)　　References Cited

U.S. PATENT DOCUMENTS

| | | | | |
|---|---|---|---|---|
| 4,592,142 A * | 6/1986 | Schnizler | A01G 3/053 | 30/233 |
| 5,531,027 A * | 7/1996 | Martinez | A01G 3/053 | 30/216 |
| 5,581,891 A * | 12/1996 | Wheeler | A01G 3/053 | 30/216 |
| 5,640,837 A * | 6/1997 | Ueyama | A01G 3/053 | 56/298 |
| 5,689,887 A * | 11/1997 | Heywood | A01G 3/053 | 30/220 |
| 5,987,753 A * | 11/1999 | Nagashima | A01G 3/053 | 30/223 |
| 6,170,159 B1 * | 1/2001 | Kramer | A01G 3/053 | 30/216 |
| 6,263,579 B1 * | 7/2001 | Nagashima | A01G 3/053 | 30/223 |
| 6,293,243 B1 * | 9/2001 | Koder | F02B 75/16 | 123/192.2 |
| 6,698,177 B1 * | 3/2004 | Akehi | F16H 21/18 | 56/236 |
| 7,757,405 B2 * | 7/2010 | Peterson | A01G 3/053 | 30/220 |
| 7,788,811 B2 * | 9/2010 | Hanada | A01G 3/053 | 30/216 |
| 8,028,423 B2 * | 10/2011 | Matsuo | A01G 3/053 | 30/220 |
| 8,397,389 B2 * | 3/2013 | Geromiller | A01G 3/053 | 30/220 |
| 8,732,959 B2 * | 5/2014 | Lugert | A01G 3/053 | 30/216 |
| 8,931,574 B2 * | 1/2015 | Watanabe | A01G 3/053 | 30/392 |
| 9,357,711 B2 * | 6/2016 | Kato | A01G 3/053 | |
| 9,603,311 B2 * | 3/2017 | Wang | A01G 3/053 | |
| 9,610,700 B2 * | 4/2017 | Hittmann | A01G 3/053 | |
| 9,723,794 B2 * | 8/2017 | Soltesz | A01G 3/053 | |
| 9,736,991 B2 * | 8/2017 | Hanada | A01G 3/053 | |
| 9,961,839 B2 * | 5/2018 | Stones | A01G 3/053 | |
| 10,798,876 B2 * | 10/2020 | Milus | A01G 3/053 | |
| 11,185,015 B2 * | 11/2021 | Chung | A01G 3/053 | |
| 11,272,671 B2 * | 3/2022 | Shimizu | A01G 3/053 | |
| 11,464,171 B2 * | 10/2022 | Sunazuka | A01G 3/053 | |
| 11,523,564 B2 * | 12/2022 | Li | A01G 3/053 | |
| 11,622,507 B2 * | 4/2023 | Li | A01G 3/053 | 30/223 |
| 11,812,706 B2 * | 11/2023 | Wang | A01G 3/053 | |
| 11,864,489 B2 * | 1/2024 | Shimizu | A01G 3/053 | |
| 11,963,489 B2 * | 4/2024 | Kitahara | A01G 3/053 | |
| 2012/0017447 A1 * | 1/2012 | Nie | A01G 3/053 | 30/277.4 |
| 2015/0223401 A1 * | 8/2015 | Schiedt | A01G 3/053 | 30/277.4 |
| 2019/0338839 A1 * | 11/2019 | Hanada | A01G 3/053 | |
| 2022/0312681 A1 * | 10/2022 | Kutsuna | A01G 3/053 | |
| 2022/0408655 A1 * | 12/2022 | Zucca | A01G 3/053 | |
| 2023/0049058 A1 * | 2/2023 | You | A01G 3/053 | |
| 2023/0413736 A1 * | 12/2023 | Corsiglia | A01G 3/053 | |
| 2024/0074359 A1 * | 3/2024 | Li | A01G 3/053 | |
| 2024/0315175 A1 * | 9/2024 | Gazsi | A01G 3/053 | |
| 2024/0397878 A1 * | 12/2024 | Sha | A01G 3/053 | |
| 2024/0418258 A1 * | 12/2024 | Braun | B25F 5/00 | |
| 2025/0098594 A1 * | 3/2025 | Yamaoka | A01G 3/053 | |

FOREIGN PATENT DOCUMENTS

| | | | | |
|---|---|---|---|---|
| CN | 216392216 U | | 4/2022 | |
| DE | 3621610 A1 * | 1/1988 | | A01G 3/053 |
| DE | 4228598 C1 * | 2/1994 | | A01G 3/053 |
| DE | 19644900 A1 * | 4/1998 | | A01G 3/053 |
| DE | 102006034293 A1 * | 1/2008 | | A01G 3/053 |
| EP | 2281440 A1 * | 2/2011 | | A01G 3/053 |
| EP | 2878191 A1 | 6/2015 | | |
| EP | 3378596 B1 * | 9/2019 | | A01G 3/053 |
| GB | 2352609 A * | 2/2001 | | A01G 3/053 |
| WO | WO-2010113541 A1 * | 10/2010 | | A01G 3/053 |

* cited by examiner

SINGLE-PIECE CRANKSHAFT

PRIORITY STATEMENT

The present application claims the benefit of priority to U.S. Provisional Patent Application Ser. No. 63/356,327, filed on Jun. 28, 2022, the disclosure of which is incorporated by reference in its entirety.

FIELD

The present disclosure relates generally to crankshaft mechanisms and hedge trimmers with crankshaft mechanisms.

BACKGROUND

Typically, handheld power tools such as hedge trimmers and chainsaws operate using crankshaft and/or scotch yoke mechanisms to convert the rotational motion of a small engine into translational motion. These mechanisms allow the handheld power tools to effectively cut through objects or perform other desired tasks. Typical crankshafts may have a multi-piece assembly. One piece may be the input of the crankshaft and one piece may be the output of the crankshaft. The input may receive power from the small engine and rotate the output section, which may be connected to some form of implement.

Multi-piece crankshafts are typically found in hedge trimmers. For instance, a motive device may spin the input and the output of the crankshaft. Subsequently, the cutting implements of the hedge trimmer will be moved linearly. However, the multi-piece crankshaft construction is large resulting in high stresses.

Accordingly, improved crankshaft mechanisms are desired in the art. In particular, crankshafts with single-piece construction would be advantageous.

BRIEF DESCRIPTION

Aspects and advantages of the invention in accordance with the present disclosure will be set forth in part in the following description, or may be obvious from the description, or may be learned through practice of the technology.

In accordance with one embodiment, a handheld power tool is provided. The handheld power tool includes a handheld power tool comprising: a first cutting implement; a second cutting implement; a motive device; and a crankshaft connecting the motive device to the first and second cutting implements, the crankshaft comprising: an input section coupled to the motive device; and an output section comprising: a first engaging member configured to drive the first cutting implement; and a second engaging member configured to drive the second cutting implement; wherein the first and second engaging members are spaced apart from each other in a direction along a rotational axis of the crankshaft and in a direction transverse to the rotational axis of the crankshaft, and wherein the first and second cutting implements are each coupled to the crankshaft by translating relative to the crankshaft in a direction along the rotational axis.

In accordance with another embodiment, a handheld power tool is provided. The handheld power tool includes a first cutting implement; a second cutting implement; a motive device; and a crankshaft connecting the motive device to the first and second cutting implements, the crankshaft comprising: an input section coupled to the motive device; and an output section comprising: a first engaging member configured to drive the first cutting implement; and a second engaging member configured to drive the second cutting implement; wherein the first and second engaging members are spaced apart from each other in a direction along a rotational axis of the crankshaft and in a direction transverse to the rotational axis of the crankshaft, and wherein the crankshaft comprises a single-piece construction in which the input section and output section are both integrally part of a single body.

In accordance with another embodiment, method of assembling a handheld power tool is provided. The method of assembling a handheld power tool includes a crankshaft and a first and second cutting implement, the method comprising: aligning a cavity of the first cutting implement with a rotational axis of the crankshaft to receive an output section of the crankshaft through the cavity; translating the first cutting implement with respect to the crankshaft in a direction parallel with the rotational axis until the first cutting implement is axially aligned with a first engaging member of the output section of the crankshaft; aligning a cavity of the second cutting implement with the rotational axis of the crankshaft to receive the output section of the crankshaft; and translating the second cutting implement with respect to the crankshaft in the same direction as the first cutting implement until the second cutting implement is axially aligned with a second engaging member of the output section of the crankshaft.

These and other features, aspects and advantages of the present invention will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present invention, including the best mode of making and using the present systems and methods, directed to one of ordinary skill in the art, is set forth in the specification, which makes reference to the appended figures, in which.

DETAILED DESCRIPTION

Figure 1:
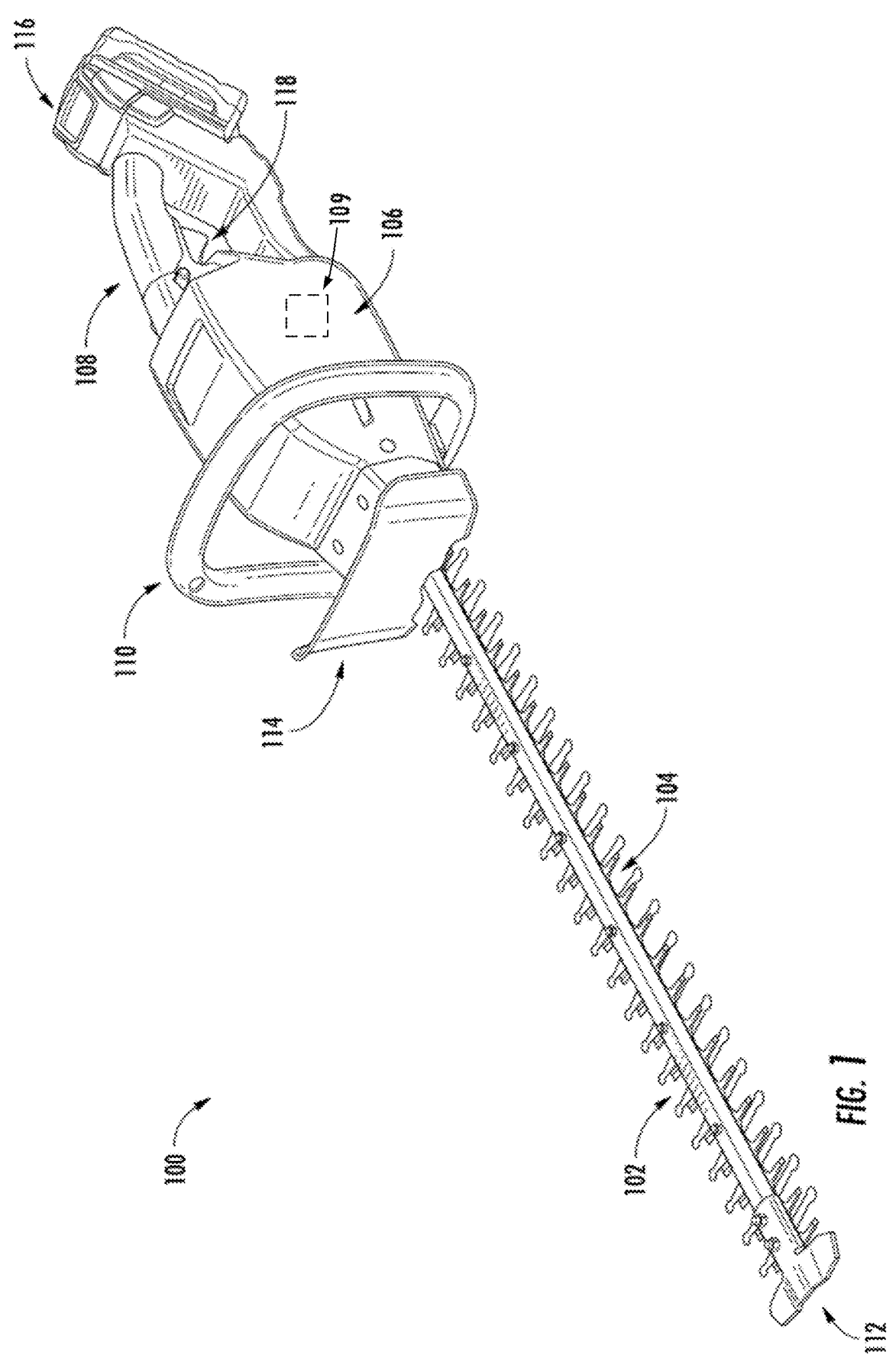
FIG. 1 is a perspective view of a hedge trimmer in accordance with embodiments of the present disclosure.

Reference now will be made in detail to embodiments of the present invention, one or more examples of which are illustrated in the drawings. The word "exemplary" is used herein to mean "serving as an example, instance, or illustration." Any implementation described herein as "exemplary" is not necessarily to be construed as preferred or advantageous over other implementations. Moreover, each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "incudes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Terms of approximation, such as "about," "generally," "approximately," or "substantially," include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

As used herein, the term "power tool" is intended to refer to a device which is used to perform a work operation, such as trimming objects like branches; cutting materials like wood, metal, concrete, grass, or the like; biasing fluids like air and water; and the like. By way of non-limiting example, power tools can include hedge trimmers, chainsaws, circular saws, reciprocating saws, grinders, pruners, string trimmers, lawnmowers, edgers, blowers, vacuums, snow throwers, mixers, augers, pumps, pipe threaders, drills, and impact wrenches. While embodiments provided below are directed to hedge trimmers, one or more components of the hedge trimmer described below, such as the single-piece crankshaft, may be utilized with one or more different types of power tools.

Benefits, other advantages, and solutions to problems are described below with regard to specific embodiments. However, the benefits, advantages, solutions to problems, and any feature(s) that may cause any benefit, advantage, or solution to occur or become more pronounced are not to be construed as a critical, required, or essential feature of any or all the claims.

In general, a handheld power tool in accordance with one or more embodiments described herein may generally include a crankshaft mechanism configured to convert rotational motion about a rotational axis into linear motion, thereby allowing a working implement, such as a cutting blade, to reciprocate efficiently. In a particular embodiment, the crankshaft may be constructed as a single piece. This may allow the handheld power tool to endure higher stresses while occupying a smaller volume.

By way of non-limiting example, the power tool may be a hedge trimmer. The hedge trimmer may include a motive device and a first and second cutting implement. The crankshaft may operably connect the motive device to the first and second cutting implements. The crankshaft may comprise an input and output section that are both integrally part of the same body. The output section of the crankshaft may comprise one or more engaging members configured to couple the first and second cutting implements to the crankshaft. The engaging members may be spaced apart along a rotational axis of the crankshaft and in a direction transverse to the rotational axis of the crankshaft. Prior to operation, the system described herein can be assembled by aligning an ovular shaped cavity defined by at least one of the first or second cutting implements with a respective one of the engaging members. Once aligned, the first and second cutting implements may be translated relative to the crankshaft in a direction along the rotational axis until they have come into contact with the appropriate engaging member. These and other advantages will become apparent to one of ordinary skill in the art after reading the entire disclosure.

Referring now to the drawings, FIG. 1 illustrates a handheld power tool in accordance with an exemplary embodiment of the present disclosure. More particularly, FIG. 1 illustrates a hedge trimmer 100 in accordance with an embodiment of the present disclosure. The hedge trimmer 100 generally includes reciprocating cutting implements 102 and 104. The cutting implements 102 and 104 include blades or "teeth" which, when the implements are reciprocated, cause the blades to cut into material, such as branches of hedges. The hedge trimmer 100 may further include a housing 106. The cutting implements 102 and 104 may extend from the housing 106. The hedge trimmer 100 may include a handle 108. In certain embodiments, the hedge trimmer 100 may further include a secondary handle 110. The hedge trimmer 100 may further include a blade tip guard 112. The blade tip guard 112 may be configured to prevent the blades located furthest from the housing 106 from contact with objects (e.g., fences, siding, etc.). The hedge trimmer 100 may further include a blade guard 114. Blade guard 114 may be configured to stop flying debris from hitting the operator.

The hedge trimmer 100 may also include a motive device 109 such as an electric motor or gas powered engine, which drives a crankshaft 200. The crankshaft may be engaged with the cutting implements 102 and 104 such that rotation of the crankshaft causes the cutting implements 102 and 104 to reciprocate. The motive device may be powered, for example, by a rechargeable energy source such as a battery 116, a fuel source such as gasoline, or the like. In the depicted embodiment, the hedge trimmer 100 includes an actuator 118. The actuator 118 is disposed proximate to the handle 108. When depressed, the actuator 118 may engage the motive device to cause the cutting implements 102 and 104 to move. As the actuator 118 is depressed further, a speed of the motive device can increase from zero speed to a maximum speed. In this regard, the actuator 118 may variably affect the speed of the motive device between a stopped speed, which occurs when the actuator 118 is not depressed, and a maximum speed, which occurs when the actuator 118 is fully depressed.

Figure 2:
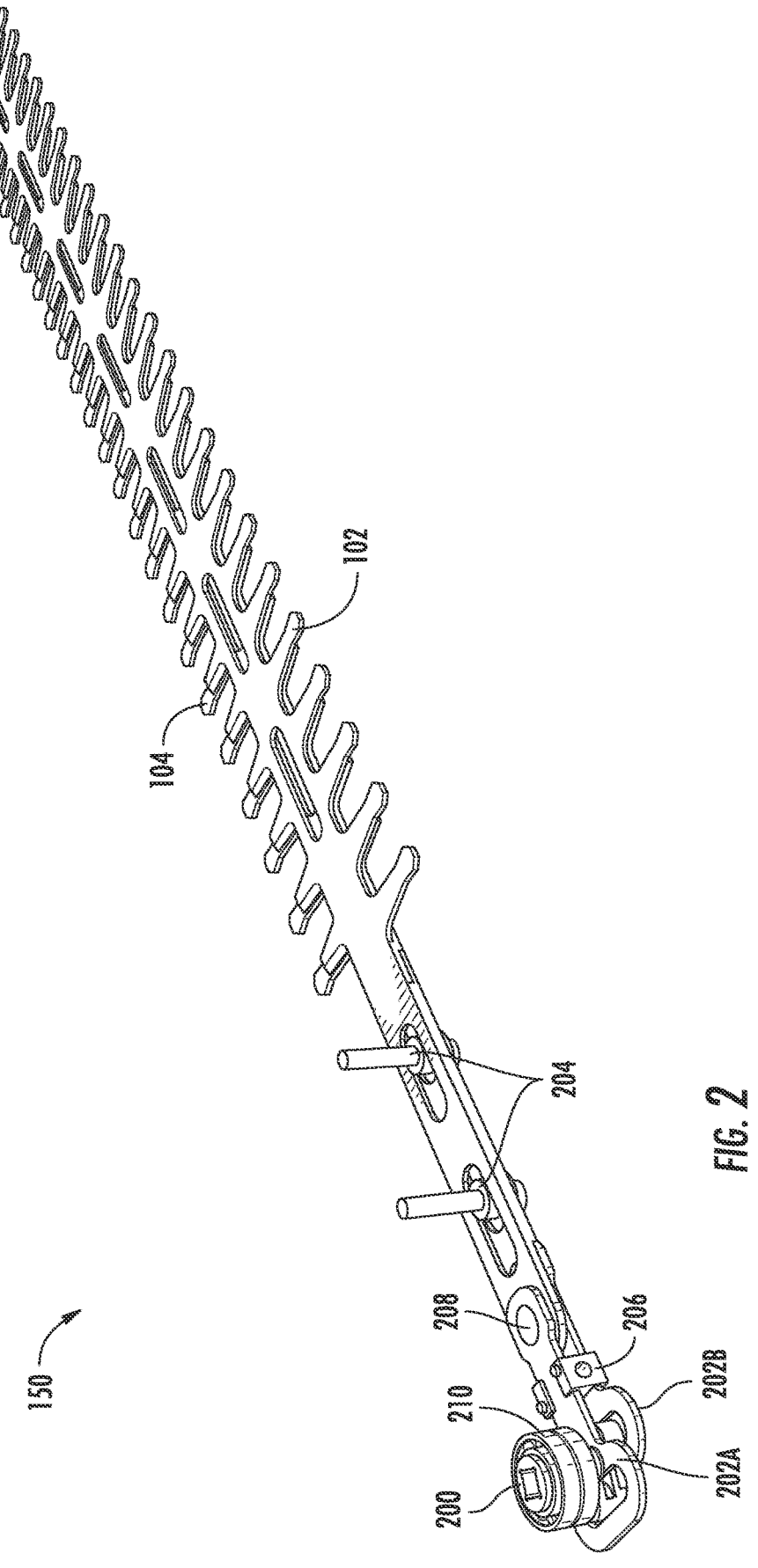
FIG. 2 is a perspective view of an assembly of the hedge trimmer in accordance with embodiments of the present disclosure.
Figure 3:
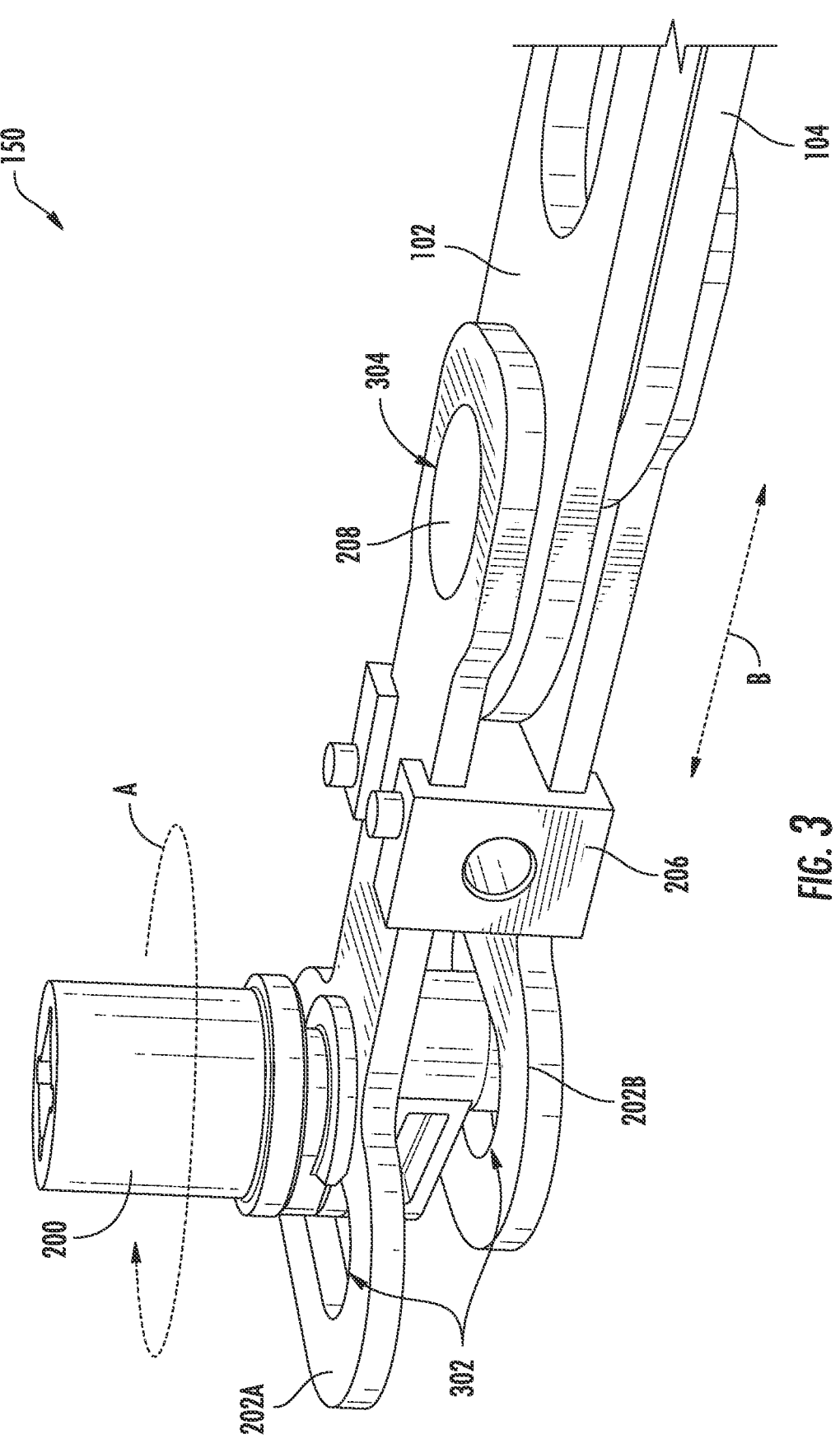
FIG. 3 is a perspective view of the assembly in accordance with embodiments of the present disclosure as seen in FIG. 2.

Referring to FIGS. 2 and 3, in accordance with one or more embodiments the hedge trimmer 100 may include an assembly 150 connecting the cutting implements 102 and 104 to a crankshaft 200. The assembly 150 may generally include one or more connecting rods 202A and 202B. Reference made hereinafter to the connecting rods 202 may refer to one or more of the first and second connecting rods 202A or 202B unless specified to the contrary. Connecting rods 202 may extend between the cutting implements 102 and 104 and the crankshaft 200. In an embodiment, the assembly 150 may include two connecting rods 202 each coupled to one of the cutting implements 102 or 104. One or more guides 204 may guide the cutting implements 102 and 104 to move in a generally reciprocating manner. A bushing 206 (e.g., a split bushing) may support and guide at least one of the connecting rods 202 or cutting implements 102 or 104. In an embodiment, the connecting rods 202 may be coupled to the cutting implements 102 and 104 through a pin 208. In another embodiment, the assembly 150 may include one or more bearings 210 coupled to the crankshaft 200. Referring to FIG. 3, the crankshaft 200 may rotate in a direction indicated by arrow A. As the crankshaft 200 rotates, the cutting implements 102 and 104 may translate in a direction indicated by arrow B.

Referring to FIG. 3, each of the connecting rods 202 may define a first cavity 302 and a second cavity 304. The first cavity 302 may be configured in a first shape, e.g., an ovular shape, and the second cavity may be configured in a second shape, e.g., a circular shape. In another embodiment, the first cavity 302 may be defined by the cutting implements 102 and 104. In alternative embodiments, the first cavity 302 and second cavity 304 may be configured as any appropriate shape. The first cavity 302 may be engaged with the crankshaft 200, while the second cavity 304 may be engaged with the pin 208. In alternative embodiments, the cavities 302 and 304 may be engaged with any suitable member of assembly 150.

Figure 4:
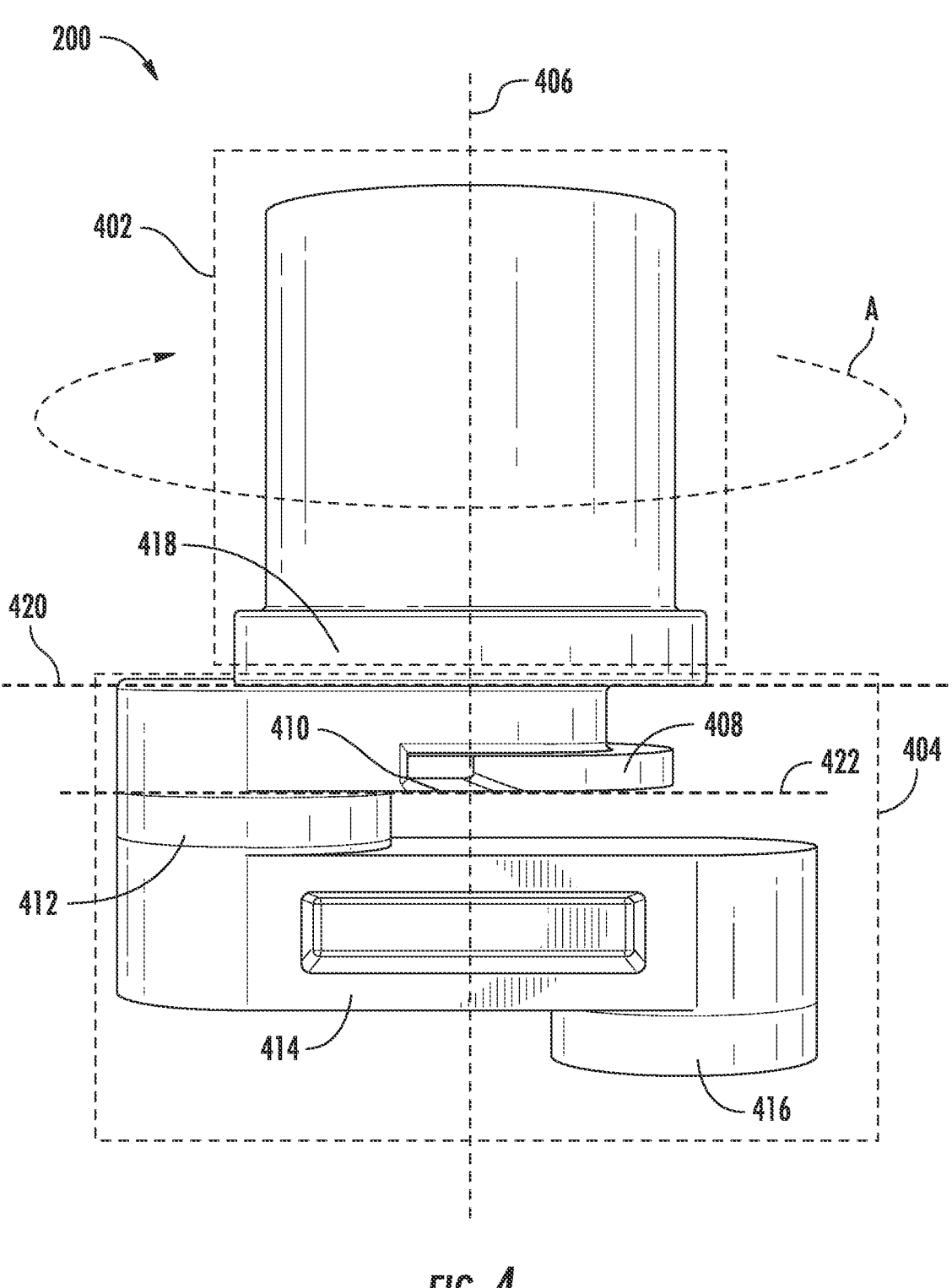
FIG. 4 is a perspective view of a crankshaft in accordance with embodiments of the present disclosure.
Figure 5:
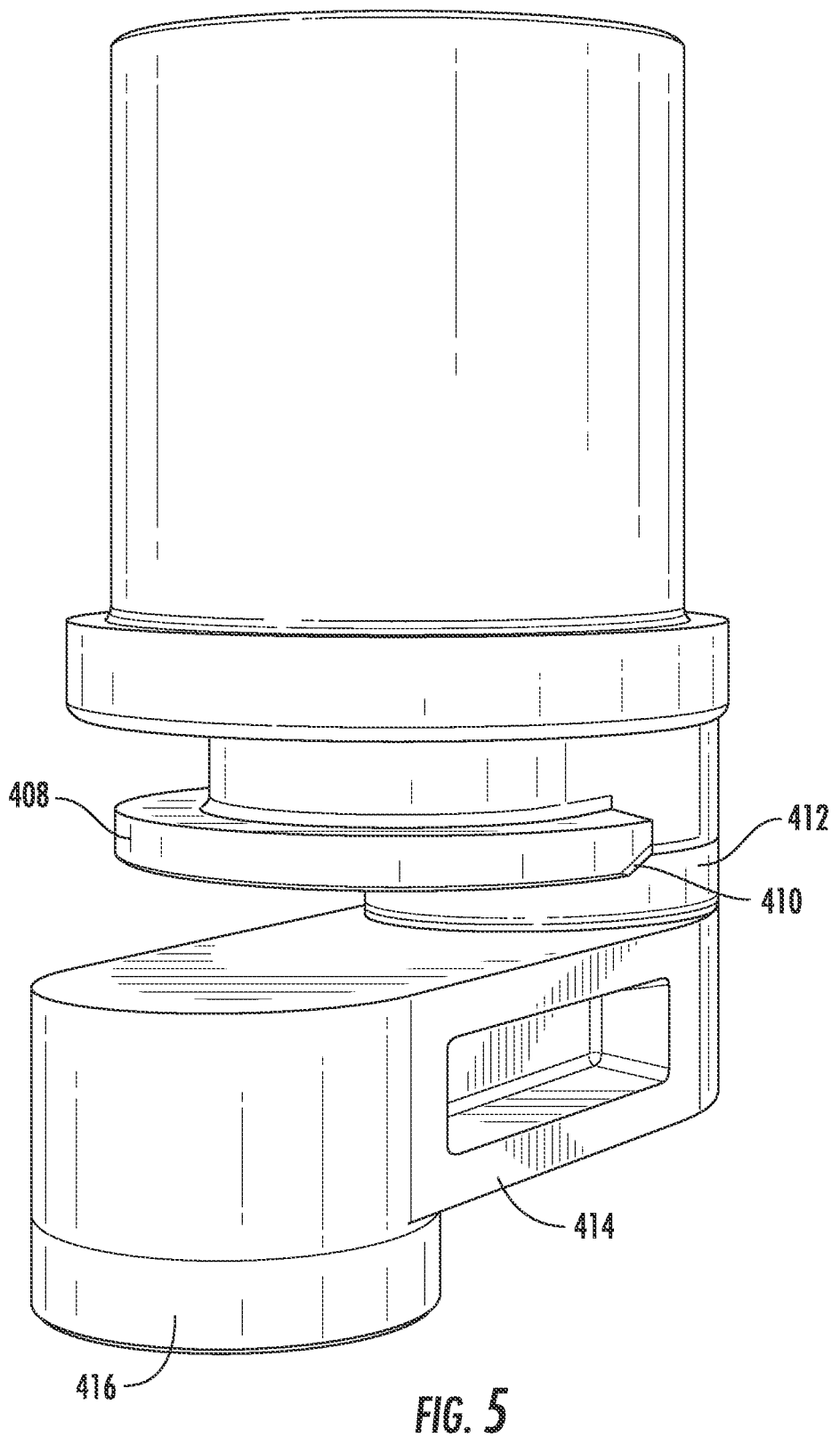
FIG. 5 is a perspective view of the crankshaft in accordance with embodiments of the present disclosure.
Figure 6:
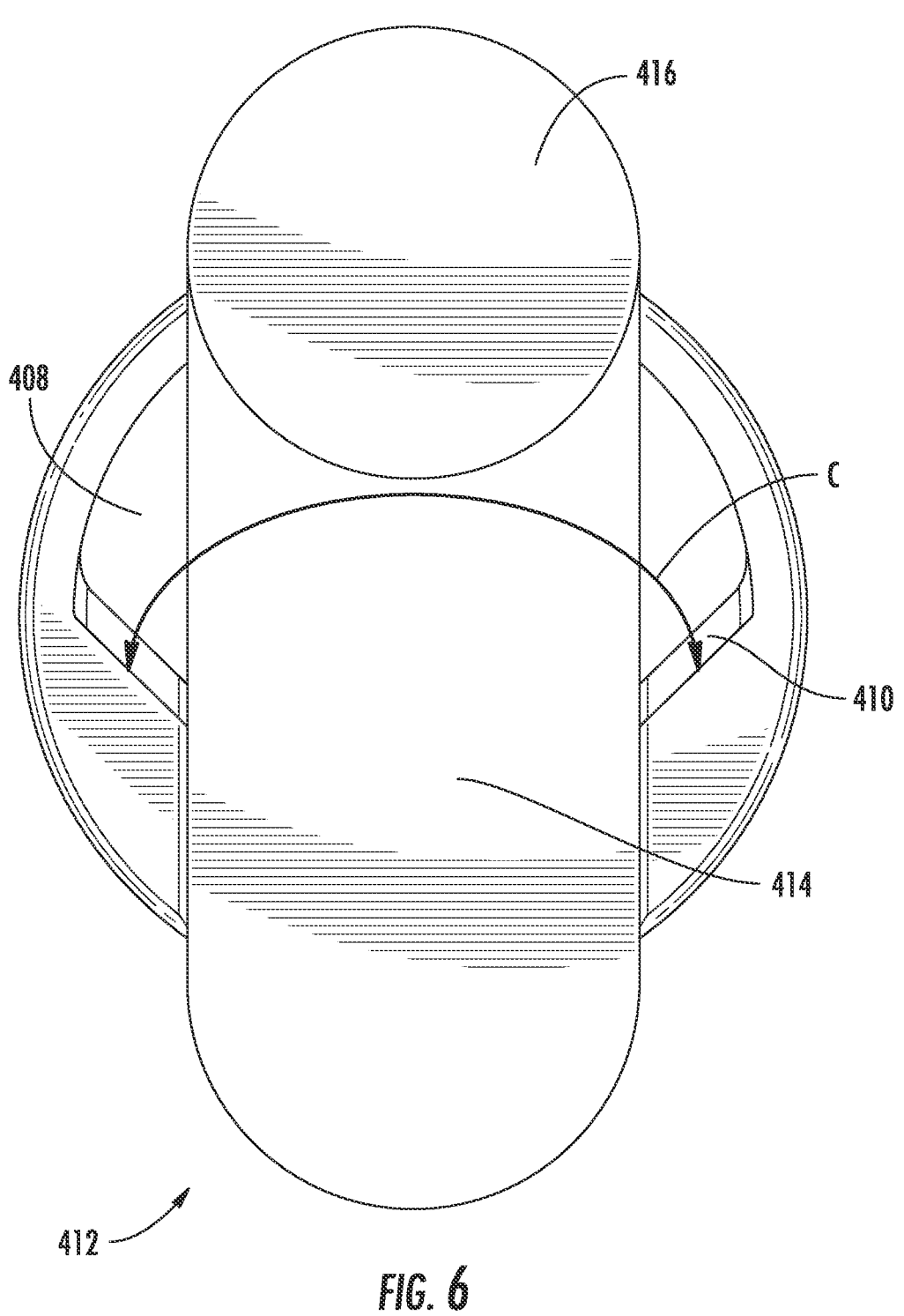
FIG. 6 is a perspective view of the crankshaft in accordance with embodiments of the present disclosure.

FIGS. 4-6 illustrate views of the crankshaft 200. Referring to FIG. 4, the crankshaft 200 may generally include an input section 402 and an output section 404. The input section 402 may be coupled to the motive device. The output section 404 may include a first engagement member 412 and a second engagement member 416. In an embodiment, the output section 404 may be coupled to the cutting implements 102 and 104. The first engagement member 412 may be configured to drive the first cutting implement 102. The second engagement member 416 may be configured to drive the second cutting implement 104. In some embodiments, the crankshaft 200 may define a rotational axis 406 around which the crankshaft 200 may rotate in the direction A. In such embodiments, the first and second engagement members 412 and 416 may drive the first and second cutting implements 102 and 104, respectfully, as the crankshaft 200 rotates about the rotational axis 406. Referring again to FIG. 3, the first cavity 302 of the connecting rods 202 may be engaged with the either of the first and second engagement members 412 and 416. As the crankshaft 200 rotates in the direction A, the first cavity 302, the bushing 206, and the guides 204 may guide the cutting implements 102 and 104 such that they are reciprocated in the direction B.

Referring again to FIG. 4, the input section 402 may include a collar 418. Collar 418 may define the end of input section 402. In such embodiments, the collar 418 may define a plane 420 oriented perpendicular to the rotational axis 406 from which the output section 404 extends. In an embodiment, the output section 404 may include a shoulder 408. The shoulder 408 may be spaced apart from the collar 418 by a distance along the rotational axis 406. Shoulder 408 may be configured to support one of the connecting rods 202 such that the first connecting rod 202A does not disengage from the first engagement member 412. In an embodiment, the shoulder 408 may include one or more beveled edges 410. Beveled edge 410 may be configured at an angle in a range of 5° and 85°, as measured relative to the surface of the shoulder 408, such as in a range of 20° and 60°. In a particular embodiment, the beveled edge 410 may be configured at an angle of approximately 45° as measured relative to the surface of the shoulder 408. In other embodiments, the beveled edge 410 may be configured at any suitable angle. The beveled edge 410 may be configured to prevent the connecting rod 202 engaged with the first engagement member 412 from catching on the shoulder 408 which might otherwise occur in non-beveled edges 410 as the first connecting rod 202A rotates about the first engagement member 412. Referring to FIG. 6, the shoulder 408 may extend radially from the output section such that a circumferential distance C between the beveled edges 410 is less than 270°. For example, in some embodiments, the circumferential distance C may be less than 240°, such as less than 210°, such as less than 180°, such as less than 150°.

In an embodiment, the shoulder 408 may further define a plane 422 oriented perpendicular to the rotational axis 406. Plane 422 may further be parallel with plane 420. As depicted in FIGS. 4-6, the first engagement member 412 may be disposed adjacent to the plane 422. For instance, the first engagement member 412 may be immediately adjacent to the plane 422. In an embodiment, a spacing member 414 may extend from the first engagement member 412 in a direction along the rotational axis 406. The spacing member 414 may be configured to separate the engagement members 412 and 416 along the rotational axis 406 such that the connecting rods 202 do not contact one another while the crankshaft 200 rotates about the rotational axis 406. Furthermore, the spacing member 414 may be configured to separate the engagement members 412 and 416 in a direction transverse to the rotational axis. In an embodiment, the second engagement member 416 may extend from the spacing member 414 in a direction along the rotational axis 406. In certain instances, the spacing member 414 may be adjacent to both engagement members 412 and 416. In some embodiments, the first engagement member 412 may further be spaced apart from the rotational axis 406 by a first distance, as measured in a direction transverse to the rotational axis. Similarly, the second engagement member 416 may be spaced apart from the rotational axis 406 by a second distance, as measured in a direction opposite to the direction of the first engagement member 412. In some instances, the first and second distances can be the same as one another. In other instances, the first and second distances may be different from one another. In an embodiment, the center point of both engagement members 412 and 416 may be connected by a straight line such that the engagement members 412 and 416 are positioned 180° relative to one another. This line may include a center point located in between the engagement members 412 and 416 which is further located at the rotational axis 406 such that the engagement members 412 and 416 are transversely equidistant from the rotational axis 406. In other embodiments, the engagement members 412 and 416 may be positioned in any suitable arrangement.

Figure 7:
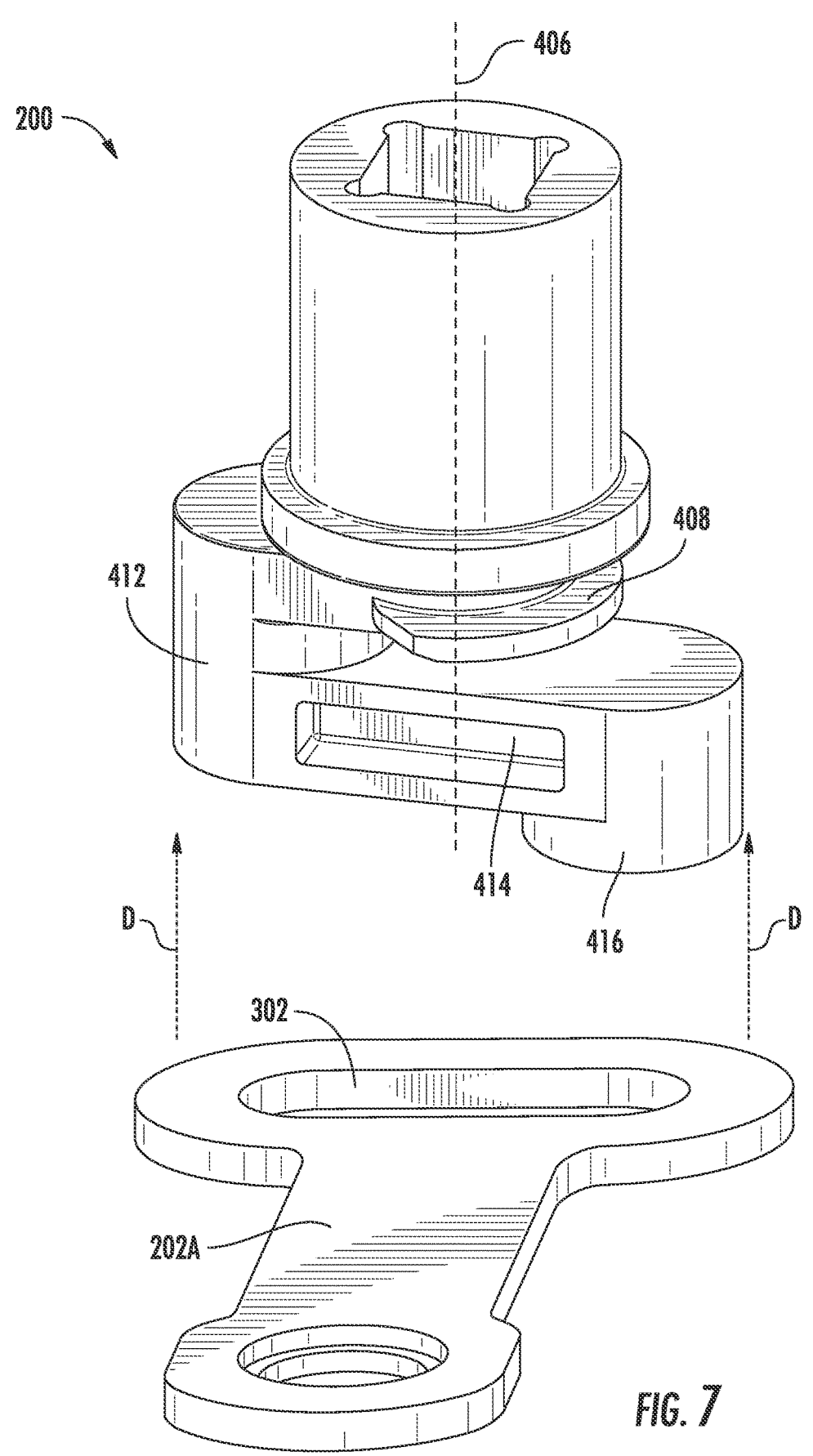
FIG. 7 is a perspective view of the crankshaft and a connecting rod assembly in accordance with embodiments of the present disclosure.

Referring now to FIG. 7, in accordance with one or more embodiments, the crankshaft 200 may be coupled to (or detached from) the cutting implements 102 and 104 by translating the first connecting rod 202A relative to the crankshaft 200 in a direction generally parallel with, e.g., along, the rotational axis 206. In the depicted embodiment, the crankshaft 200 comprises a single body. As such, the engagement members 412 and 416 cannot be accessed by the connecting rods 202 through removal of portions of the crankshaft 200. In some embodiments, the engagement members 412 and 416 may each have a circular cross section. The circular cross section may allow the engagement members 412 and 416 to receive the connecting rods 202 such that the cutting implements 102 and 104 may be coupled to the crankshaft 200. In the depicted embodiment, the first connecting rod 202A may be aligned relative to the crankshaft 200 such that the first connecting rod 202A may be translated a first distance in a direction D parallel to the rotational axis 406 such that the spacing member 414 and second engagement member 416 may fit through the cavity 302. The first connecting rod 202A may be translated past the second engagement member 416 and spacing member 414 until the first connecting rod 202A contacts the shoulder 408. After the first connecting rod 202A has passed the spacing member 414, the first connecting rod 202A may be engaged with the first engagement member 412 such that when the crankshaft 200 rotates, the first connecting rod 202A may reciprocate in a linear direction, thus reciprocating the first cutting implement 102. In an embodiment, the second connecting rod 202B may be translated a second distance, less than the first distance, along the same direction D such that the cavity 302 of the second connecting rod 202B may be engaged with the second engagement member 416.

In another embodiment, after the second connecting rod 202B has been engaged, a slide plate (not illustrated) may enclose the assembly 150 (FIG. 3) such that the second connecting rod 202B remains engaged with the second engagement member 416.

In embodiments depicted in FIG. 4-7, the crankshaft 200 is constructed as a single body. In such embodiments, the input and output sections 402 and 404 of crankshaft 200 may integrally be a part of the same body. The single-body construction of the crankshaft 200 may allow the material to endure higher stresses while occupying a smaller volume. Additionally, the single-body construction may allow the assembly 150 to be constructed using methods described above. For example, in an embodiment, the connecting rods 202 may be aligned relative to the crankshaft 200 and translated along the rotational axis 406 such that the connecting rods 202 may engage either the first or second engagement members 412 or 416. In other embodiments, the assembly 150 may be constructed in any suitable manner such that the crankshaft 200 is a single body and converts rotational motion about a rotational axis 406 into linear motion.

In an embodiment, the crankshaft 200 may be casted using a single mold such that the input and output sections 402 and 404 are integrated in a single body. In another embodiment, the crankshaft 200 may not include any seams on the body. In another embodiment, the crankshaft 200 may be welded together such that the input and output sections 402 and 404 cannot be separated. In another embodiment, the crankshaft 200 may be forged from a single piece of suitable material. In other embodiments, the crankshaft 200 may be manufactured in any appropriate manner such that the crankshaft 200 is a single body.

Further aspects of the invention are provided by one or more of the following embodiments:

Embodiment 1. A handheld power tool comprising: a first cutting implement; a second cutting implement; a motive device; and a crankshaft connecting the motive device to the first and second cutting implements, the crankshaft comprising: an input section coupled to the motive device; and an output section comprising: a first engaging member configured to drive the first cutting implement; and a second engaging member configured to drive the second cutting implement; wherein the first and second engaging members are spaced apart from each other in a direction along a rotational axis of the crankshaft and in a direction transverse to the rotational axis of the crankshaft, and wherein the first and second cutting implements are each coupled to the crankshaft by translating relative to the crankshaft in a direction along the rotational axis.

Embodiment 2. The handheld power tool of any one or more of the embodiments, wherein the first and second cutting implements each comprise a connecting rod defining a cavity.

Embodiment 3. The handheld power tool of any one or more of the embodiments, wherein the cavity of the first connecting rod has an oval cross-sectional shape, wherein the first engaging member has a circular cross-sectional shape, and wherein the cavity of the first connecting rod receives the first engaging member.

Embodiment 4. The handheld power tool of any one or more of the embodiments, wherein the crankshaft comprises a single-piece construction in which the input section and output section are both integrally part of a single body.

Embodiment 5. The handheld power tool of any one or more of the embodiments, wherein the crankshaft comprises a shoulder with a beveled edge.

Embodiment 6. The handheld power tool of any one or more of the embodiments, wherein the shoulder extends a circumferential distance around an axis extending parallel with the rotational axis, and wherein the circumferential distance is less than 270°.

Embodiment 7. The handheld power tool of any one or more of the embodiments, wherein the power tool further comprises a bearing assembly coupled between the input section of the crankshaft and a support structure of the power tool.

Embodiment 8. The handheld power tool of any one or more of the embodiments, wherein a slide plate is coupled adjacent to the second engaging member of the crankshaft.

Embodiment 9. The handheld power tool of any one or more of the embodiments, wherein the first and second cutting implements are slidably coupled together by a bushing spaced apart from the crank shaft, and wherein the bushing is configured to maintain the first and second cutting implements in alignment with the first and second engaging members, respectively.

Embodiment 10. The handheld power tool of any one or more of the embodiments, wherein the crankshaft comprises a spacing member disposed adjacent to both the first and second engaging members, wherein the spacing member contacts both the first and second cutting implements.

Embodiment 11. The handheld power tool of any one or more of the embodiments, wherein the first and second engaging members are configured to convert rotational motion of the crankshaft about the rotational axis to linear motion of the first and second cutting implements.

Embodiment 12. The handheld power tool of any one or more of the embodiments, wherein the handheld power tool is a hedge trimmer.

Embodiment 13. A handheld power tool comprising: a first cutting implement; a second cutting implement; a motive device; and a crankshaft connecting the motive device to the first and second cutting implements, the crankshaft comprising: an input section coupled to the motive device; and an output section comprising: a first engaging member configured to drive the first cutting implement; and a second engaging member configured to drive the second cutting implement; wherein the first and second engaging members are spaced apart from each other in a direction along a rotational axis of the crankshaft and in a direction transverse to the rotational axis of the crankshaft, and wherein the crankshaft comprises a single-piece construction in which the input section and output section are both integrally part of a single body.

Embodiment 14. A method of assembling a handheld power tool including a crankshaft and a first and second cutting implement, the method comprising: aligning a cavity of the first cutting implement with a rotational axis of the crankshaft to receive an output section of the crankshaft through the cavity; translating the first cutting implement with respect to the crankshaft in a direction parallel with the rotational axis until the first cutting implement is axially aligned with a first engaging member of the output section of the crankshaft; aligning a cavity of the second cutting implement with the rotational axis of the crankshaft to receive the output section of the crankshaft; and translating the second cutting implement with respect to the crankshaft in the same direction as the first cutting implement until the second cutting implement is axially aligned with a second engaging member of the output section of the crankshaft.

Embodiment 15. The method of any one or more of the embodiments, wherein the crankshaft comprises a single-piece construction.

Embodiment 16. The method of any one or more of the embodiments, wherein aligning the cavity of the second cutting implement with the rotational axis of the crankshaft is performed after translating the first cutting implement.

Embodiment 17. The method of any one or more of the embodiments, wherein the method further comprises coupling the first and second cutting implements with a bushing, the bushing being spaced apart from the crankshaft in a transverse direction relative to the rotational axis.

Embodiment 18. The method of any one or more of the embodiments, wherein translating the first cutting implement comprises translating the first cutting implement a first distance parallel with the rotational axis, wherein translating the second cutting implement comprises translating the second cutting implement a second distance parallel with the rotational axis, and wherein the first distance is greater than the second distance.

Embodiment 19. The method of any one or more of the embodiments, wherein translating the first cutting implement is performed until the first cutting implement contacts a shoulder of the crankshaft, and wherein the first engaging member is disposed between the second engaging member and the shoulder.

Embodiment 20. The method of any one or more of the embodiments, wherein the crankshaft comprises a spacing member extending in a transverse direction between the first and second engaging members, and wherein translating the first cutting implement is performed by passing the first cutting implement by the second engaging mechanism and the spacing member prior to reaching the first engaging member.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A handheld power tool comprising:
a first cutting implement;
a second cutting implement;
a motive device; and
a crankshaft connecting the motive device to the first and second cutting implements, the crankshaft comprising:
an input section coupled to the motive device; and
an output section comprising:
a first engaging member configured to drive the first cutting implement; and
a second engaging member configured to drive the second cutting implement;
wherein the first and second engaging members are spaced apart from each other in a direction along a rotational axis of the crankshaft and in a direction transverse to the rotational axis of the crankshaft, and
wherein the first and second cutting implements are each configured to be detached from the crankshaft by translating relative to the crankshaft in a direction along the rotational axis.

2. The handheld power tool of claim 1, wherein the first and second cutting implements each comprise a connecting rod defining a cavity.

3. The handheld power tool of claim 2, wherein the cavity of the first connecting rod has an oval cross-sectional shape, wherein the first engaging member has a circular cross-sectional shape, and wherein the cavity of the first connecting rod receives the first engaging member.

4. The handheld power tool of claim 1, wherein the crankshaft comprises a single-piece construction in which the input section and output section are both integrally part of a single body.

5. The handheld power tool of claim 1, wherein the crankshaft comprises a shoulder with a beveled edge.

6. The handheld power tool of claim 5, wherein the shoulder extends a circumferential distance around an axis extending parallel with the rotational axis, and wherein the circumferential distance is less than 270°.

7. The handheld power tool of claim 1, wherein the power tool further comprises a bearing assembly coupled to the input section of the crankshaft.

8. The handheld power tool of claim 1, wherein translating the first and second cutting implements in the direction comprises translating the second cutting implement less distance than the first cutting implement.

9. The handheld power tool of claim 1, wherein the first and second cutting implements are slidably coupled together by a bushing spaced apart from the crank shaft, and wherein the bushing is configured to maintain the first and second cutting implements in alignment with the first and second engaging members, respectively.

10. The handheld power tool of claim 1, wherein the crankshaft comprises a spacing member disposed adjacent to both the first and second engaging members, wherein the spacing member contacts both the first and second cutting implements.

11. The handheld power tool of claim 1, wherein the first and second engaging members are configured to convert rotational motion of the crankshaft about the rotational axis to linear motion of the first and second cutting implements.

12. The handheld power tool of claim 1, wherein the handheld power tool is a hedge trimmer.

13. A handheld power tool comprising:
a first cutting implement;
a second cutting implement;
a motive device; and
a crankshaft connecting the motive device to the first and second cutting implements, the crankshaft comprising:
an input section coupled to the motive device; and
an output section comprising:
a first engaging member configured to drive the first cutting implement; and
a second engaging member configured to drive the second cutting implement;
wherein the first and second engaging members are spaced apart from each other in a direction along a rotational axis of the crankshaft and in a direction transverse to the rotational axis of the crankshaft,
wherein the input section of the crankshaft is spaced apart from the first and second engaging members, and wherein the crankshaft comprises a single-piece construction in which the input section and output section are both integrally part of a single body.

14. The handheld power tool of claim 13, wherein the first and second cutting implements each comprise a connecting rod defining a cavity.

15. The handheld power tool of claim 14, wherein the cavity of the first connecting rod has an oval cross-sectional shape, wherein the first engaging member has a circular cross-sectional shape, and wherein the cavity of the first connecting rod receives the first engaging member.

16. The handheld power tool of claim 13, wherein the crankshaft comprises a shoulder with a beveled edge.

17. The handheld power tool of claim 16, wherein the shoulder extends a circumferential distance around an axis extending parallel with the rotational axis, and wherein the circumferential distance is less than 270°.

18. The handheld power tool of claim 13, wherein the power tool further comprises a bearing assembly coupled to the input section of the crankshaft.

19. The handheld power tool of claim 13, wherein translating the first and second cutting implements in the direction comprises translating the second cutting implement less distance than the first cutting implement.

20. The handheld power tool of claim 13, wherein the crankshaft comprises a spacing member disposed adjacent to both the first and second engaging members, wherein the spacing member contacts both the first and second cutting implements.

* * * * *